United States Patent
Chou et al.

(10) Patent No.: US 6,330,499 B1
(45) Date of Patent: Dec. 11, 2001

(54) SYSTEM AND METHOD FOR VEHICLE DIAGNOSTICS AND HEALTH MONITORING

(75) Inventors: Paul Bao-Luo Chou, Montvale, NJ (US); Bhavani S. Iyer, Mt. Kisco, NY (US); Jennifer Lai, Garrison, NY (US); Anthony Levas, Yorktown Heights, NY (US); Lawrence Isaac Lieberman, Scarsdale, NY (US); Te-Kai Liu, Elmsford, NY (US); Paul Andrew Moskowitz, Yorktown Heights, NY (US); Jung-Mu Tang, South Salem, NY (US); Rose Marie Williams, Wappinger Falls, NY (US); Danny Chan-Yong Wong, Allendale, NJ (US); Alan Chakra; Euiyoung Kim, both of Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/357,840

(22) Filed: Jul. 21, 1999

(51) Int. Cl.[7] .............................. G01M 17/00; H04B 1/38
(52) U.S. Cl. .................................................. 701/33; 701/32
(58) Field of Search ................................... 701/29, 33, 32, 701/207; 342/357.09; 709/203; 340/539

(56) References Cited

U.S. PATENT DOCUMENTS

| | | |
|---|---|---|
| 4,128,005 | 12/1978 | Arnston et al. . |
| 4,827,520 | 5/1989 | Zeinstra . |
| 4,866,515 | 9/1989 | Tagawa et al. . |
| 5,041,976 | 8/1991 | Marko et al. . |
| 5,107,428 | 4/1992 | Bethencourt et al. . |
| 5,150,609 | 9/1992 | Ebner et al. . |
| 5,155,689 * | 10/1992 | Wortham ............................... 364/460 |
| 5,313,388 | 5/1994 | Cortis . |
| 5,333,177 | 7/1994 | Braitberg et al. . |
| 5,367,667 * | 11/1994 | Wahlquist et al. ..................... 395/575 |
| 5,400,018 | 3/1995 | Scholl et al. . |
| 5,442,553 | 8/1995 | Parrillo . |
| 5,442,633 | 8/1995 | Perkins et al. . |
| 5,479,479 | 12/1995 | Braitberg et al. . |
| 5,652,911 | 7/1997 | Van Venrooy et al. . |
| 5,732,074 | 3/1998 | Spaur et al. . |
| 5,758,300 | 5/1998 | Abe . |
| 5,794,164 | 8/1998 | Beckert et al. . |
| 5,805,079 | 9/1998 | Lemelson . |
| 5,808,907 * | 9/1998 | Shetty et al. ..................... 364/551.02 |
| 5,809,437 | 9/1998 | Breed . |
| 5,815,071 | 9/1998 | Doyle . |
| 6,127,947 * | 10/2000 | Uchida et al. ......................... 340/999 |
| 6,154,658 * | 11/2000 | Caci ....................................... 455/466 |
| 6,181,994 * | 1/2001 | Colson et al. ........................... 701/33 |
| 6,240,365 * | 5/2001 | Bunn ..................................... 701/213 |
| 6,263,268 * | 7/2001 | Nathanson ............................... 701/29 |

OTHER PUBLICATIONS

Research Disclosure 42261; Jun. 1999; anonymous.*
Jameel et al; Internet multimedia on wheels: connecting cars to cyberspace; ITSC '97; IEEE Conf. Nov. 1997; pp. 637–642.*
IBM Technical Disclosure, "Wireless Hardware on Local Area Network", Cato, et. al., vol. 34, No. 6, Nov. 1991, pp. 367–394.

* cited by examiner

Primary Examiner—Michael J. Zanelli
(74) Attorney, Agent, or Firm—Stephen C. Kaufman, Esq.; McGinn & Gibb, PLLC (57) ABSTRACT

A system and method for vehicle diagnostic and health monitoring includes a client computer device within the vehicle, coupled to the vehicle's monitoring systems, for data management, remote session management and user interaction, a communication system, coupled to the client computer device, for providing remote communication of data including data derived from internal monitoring systems of the vehicle, and a remote service center including a vehicle data store, a server computer, a diagnostic engine, and a communicator for communicating the results of analysis of vehicle information to the client computer device via the communication system.

24 Claims, 5 Drawing Sheets

SYSTEM AND METHOD FOR VEHICLE DIAGNOSTICS AND HEALTH MONITORING

BACKGROUND OF THE INVENTION

1. Field of the Invention

The present invention generally relates to a vehicle monitoring system and method, and more particularly to a method and system for vehicle diagnostics and health monitoring.

2. Description of the Related Art

Motor vehicles contain complex mechanical systems that are monitored and regulated by computer systems such as electronic control units (ECUs) and the like.

Such ECUs monitor various components of the vehicle including engine performance, carburation, speed/acceleration control, transmission, exhaust gas recirculation (EGR), braking systems, etc.

However, vehicles perform such monitoring typically only for the vehicle driver and without communication of any impending results, problems and/or vehicle malfunction to a remote site for trouble-shooting, diagnosis or tracking for data mining.

Systems that provide for remote monitoring do not have a means for automated analysis and communication of problems or potential problems and recommendations to the driver.

As a result, the vehicle driver or user is often left stranded, or irreparable damage occurs to the vehicle as a result of neglect or driving the vehicle without the user knowing the vehicle is malfunctioning until it is too late.

SUMMARY OF THE INVENTION

In view of the foregoing and other problems of the conventional methods and structures, an object of the present invention is to provide a method and structure to extract information provided by the vehicle's internal monitoring systems, to transfer that information to a remote service center, to provide a means and method for comparison and analysis of the information, and to provide timely information to the driver of the vehicle.

In a first aspect of the present invention, an information system for a vehicle includes an electronic data collector (e.g., preferably for obtaining electronic data from the vehicle's internal monitoring systems), a client computer device within the vehicle (e.g., preferably for data management, remote session management and user interaction), a communication unit (e.g., preferably coupled to the client computer device, for providing remote communication for the client computer device), a remote service center (e.g., including a vehicle data store, a server computer, and a call center for communicating with the client computer device via the communication unit).

With the unique and unobvious structure and method of the invention, information can be reliably extracted from a vehicle's internal monitoring systems, and the information can be transferred to a remote service center. Further, the information can be compared and analyzed, to provide timely information for the driver of the vehicle to avoid the vehicle driver being stranded or the vehicle being irreparably damaged. Additionally, the ability of a driver to initiate health checkups brings the driver assurance of the proper functioning of his vehicle as well as reminders for preventive maintenance which will prevent the development of problems.

This system and method benefits the vehicle manufacturer and service provider by enhancing customer loyalty and providing timely feedback to solve engineering and manufacturing problems.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Referring now to the drawings, and more particularly to FIGS. 1–5, there are shown preferred embodiments of the method and structures according to the present invention.

Figure 1:
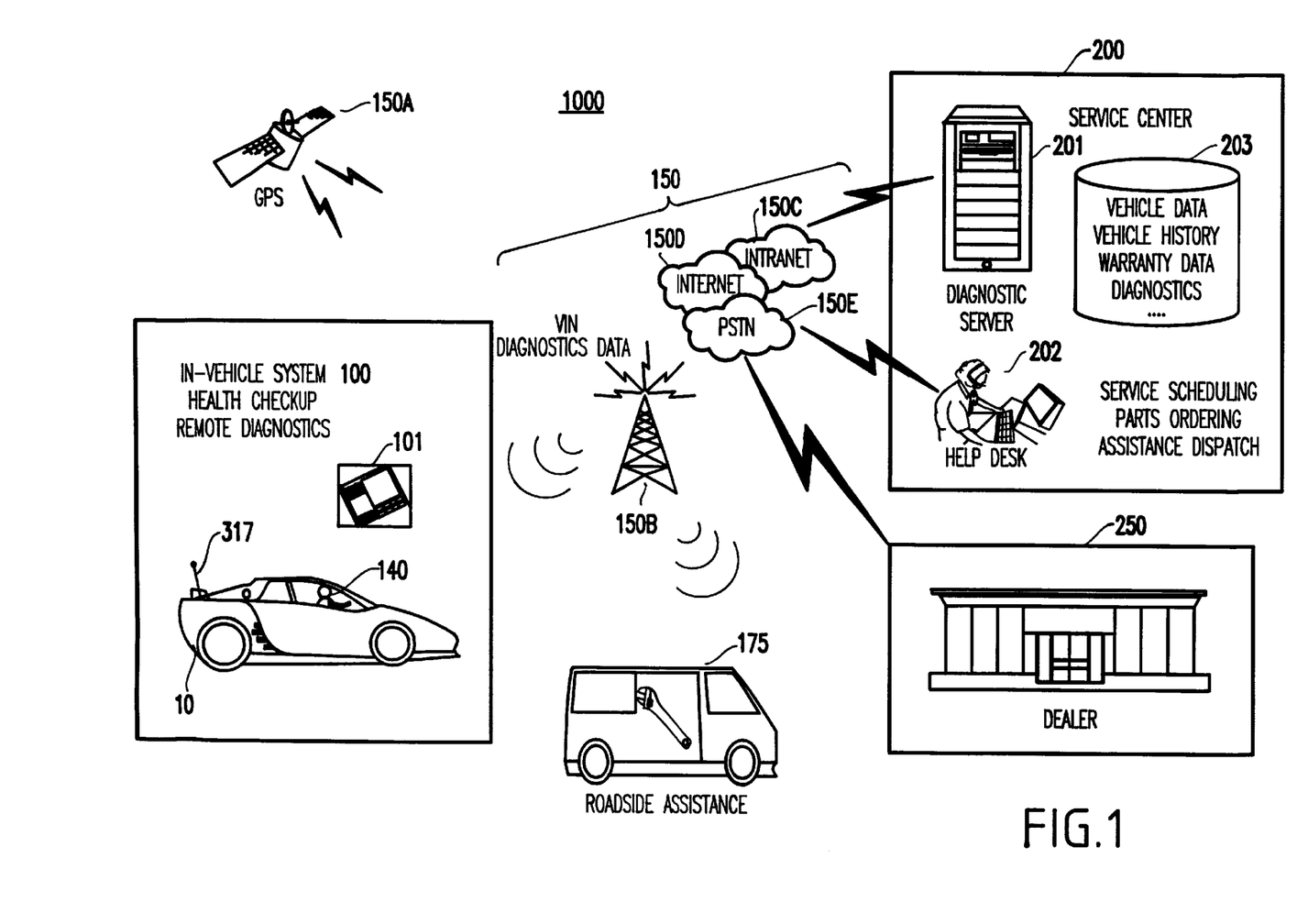
FIG. 1 illustrates an upper level environment in which the present invention is utilized.

FIG. 1 illustrates an upper level environment of a system according to the present invention.

As shown in FIG. 1, the system 1000 includes a vehicle 10 with a vehicle driver or user 140, having an in-vehicle computing system 100, a client computer device 101 installed to enable vehicle health checkup and remote diagnostics, a communication link 150 (e.g., via wireless base stations 150B, or the like) for communicating vehicle information (e.g., vehicle identification number, (VIN), diagnostic data, and the like). Such a link may be interfaced with an intranet 150C, the Internet 150D, or a public (or private) switch telephone network (PSTN) 150E. Further shown, the vehicle location is established, for example by a device 317 (e.g., antenna or the like) for receiving positioning information from orbiting Global Positioning System (GPS) satellites 150A.

Further shown is a roadside assistance unit 175 for assisting the vehicle based on a signal received over the communication link 150.

A remote service center 200 is also provided having a diagnostic server 201, a help desk 202 and a data repository 203. The help desk 202 schedules services, orders parts, and dispatches assistance through the roadside assistance unit 175.

Further, a dealer 250 is shown communicating with the remote service center 200 and optionally with the vehicle 10.

Figure 2:
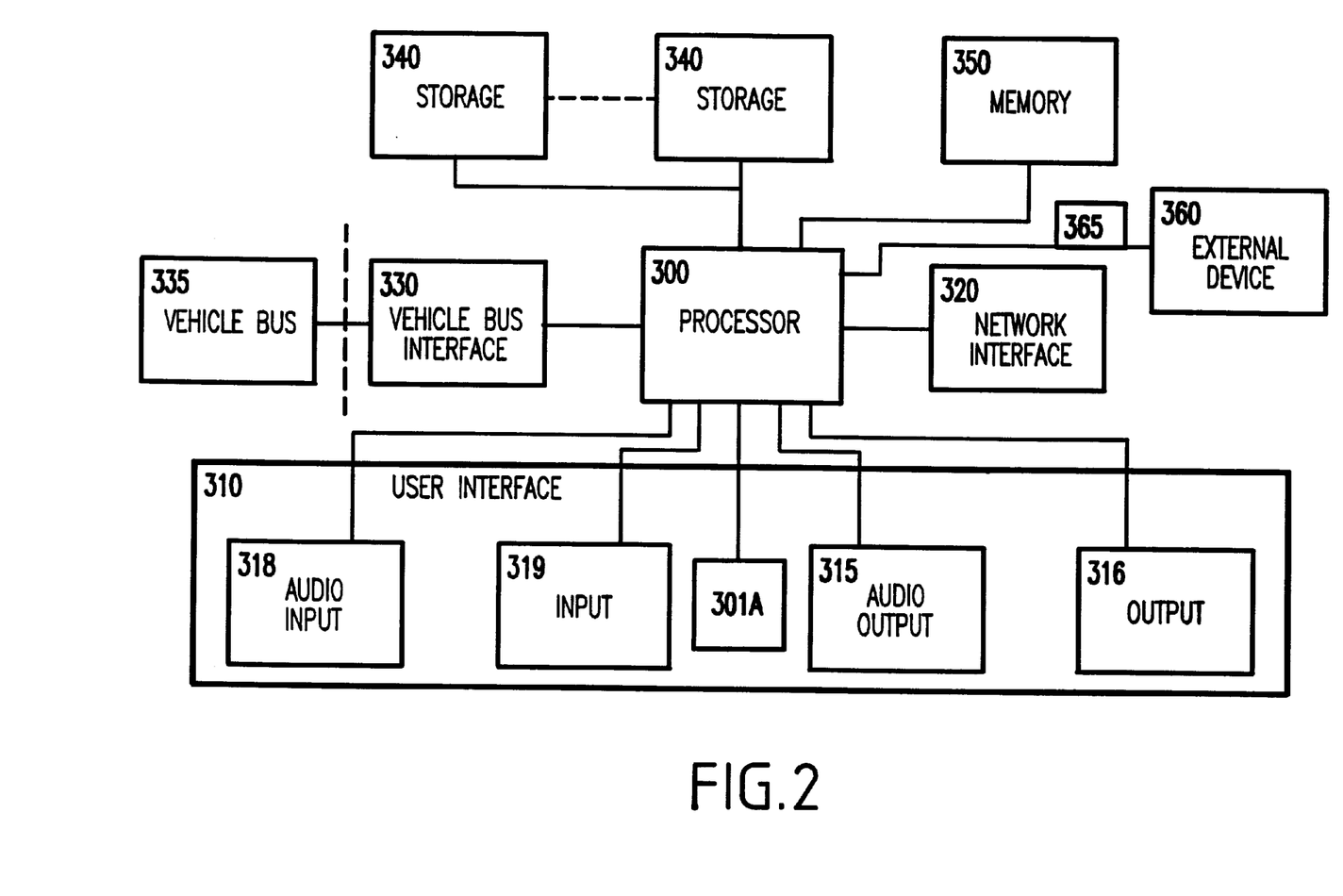
FIG. 2 illustrates exemplary in-vehicle hardware components for the system shown in FIG. 3.

FIG. 2 is a block diagram providing an exemplary component overview for the in-vehicle hardware. The in-vehicle hardware provides a platform for the client computer device 101 and for the system functions shown in the architectural design in FIG. 3. As shown in FIG. 2, the in-vehicle hardware includes a processor 300 coupled with memory 350, a user interface 310, a network interface 320, a vehicle interface 330, at least one persistent storage device 340, and optional external devices 360.

The processor 300 may be of a conventional type or it may be an embedded system depending upon the designer's requirements. Examples include an Intel Pentium®, or the Hitachi SH-4 for an embedded system.

The user interface includes one or more input means such as an audio input 318 capability for speech recognition, speaker identification, or voice recording. For this a microphone such as those manufactured by AKG or Sony can be used. Other input means 319 may include a touch screen for, as an example, entering menu selections by pressing a particular area of the screen, and actuator buttons 301A such as a push-to-talk (PTT) button to initiate audio input to the processor or a "911" button for triggering a call for emergency help. The user interface also includes a plurality of output means such as an audio output capability 315 for generating auditory signals, text-to-speech, and prerecorded voice playback. The audio output may be coupled to the vehicle's speakers. The output means 316 may also include a display screen and indicator lights.

The processor is integrated with a network interface 320 to provide communication capability with the remote service center 200. Preferably, the network interface comprises a removable wireless telephone such as the Motorola i1000+ and a docking facility for the wireless phone integrated with the client computer device. Both voice and data connections can be supported by interfacing the processor 300 and the wireless phone. The telephone integration provides basic communication functions. It establishes a data (e.g. TCP/IP) connection with a remote service center (e.g., remote service center 200). Wireless technologies such as GSM (Global System for Mobile Communications), CDMA (Code Division Multiple Access), TDMA (Time Division Multiple Access), iDEN™ (a TDMA-based Motorola technology), and AMPS (Advanced Mobile Phone System) can all be supported. The phone may also be used for wireless voice communications.

The processor 300 is coupled to a vehicle bus 335 through a vehicle bus interface 330. The coupling between the client computer device and the vehicle bus interface 106 of FIG. 3, may be one of RS-232, USB (Universal Serial Bus), IDB (ITS Data Bus), Ethernet, and the like. The vehicle bus interface may support one of vehicle bus standards such as CAN (Controller Area Network) and the Society of Automotive Engineers' SAE J1850 - Class B Data Communication Network Interface. Alternatively, the processor supports some or all of the functions of the vehicle bus interface and connects directly to the vehicle bus 335. The vehicle bus shown in FIG. 2 is an inherent part of all new automobiles. The dotted line is used as an indication that the vehicle bus is built into the vehicle.

The in-vehicle hardware includes at least one persistent storage device 340 such a hard disk, CD-ROM, flash memory, and the like coupled to the processor. The processor may also be coupled by additional interface means 365 such as infrared, RF, serial and parallel ports and the like, to communicate with external devices 360 such as printer, fax, personal digital assistant (PDA), notebook computer, etc. Optionally, the processor 300 may be coupled to a location sensing device such as a GPS receiver 317 (FIG. 1) to provide vehicle location information. The system may or may not assume the availability of the automatic vehicle position information. Location-related scenarios, such as emergency help dispatch may use automatic vehicle positioning or may depend on the driver to provide position information.

In an exemplary system, such capabilities have been provided. Further, other computing devices such as a laptop computer or personal data assistant (PDA) may be used to perform the function of the processor 300 and some or all of the additional hardware components and to provide the hardware platform for the client computer device 101.

In-Vehicle Computing System

Figure 3:
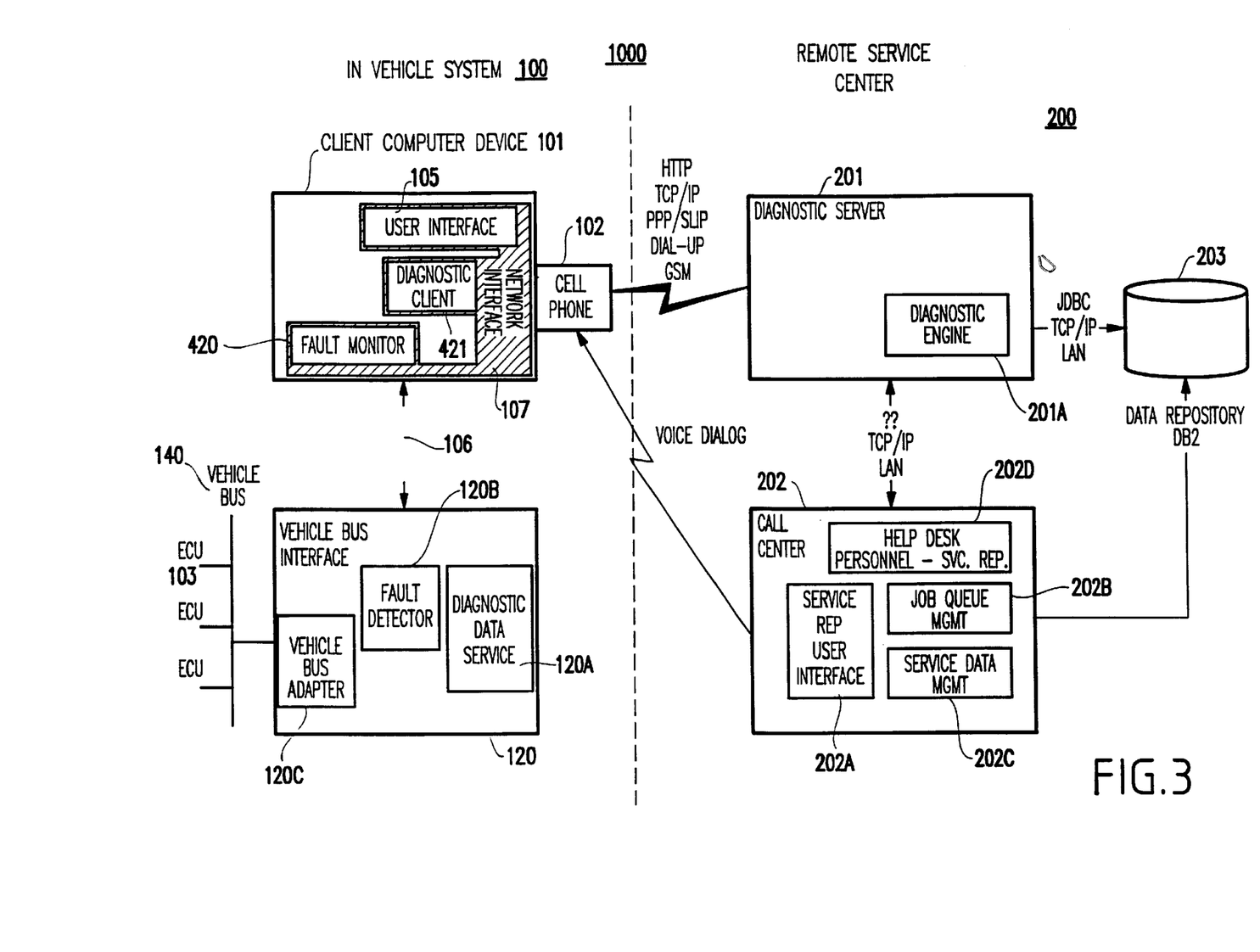
FIG. 3 illustrates an exemplary architecture of a fault monitoring and diagnosis system according to the present invention.

FIG. 3 depicts a more detailed system architectural view of a preferred embodiment of the system 1000 according to the present invention for fault monitoring and diagnosis. The system includes the in-vehicle system 100 (including client computer device 101) and the remote service center 200.

The application software that makes up the in-vehicle computing system 100 includes an in-vehicle client computer device 101 and a vehicle bus interface 120. The vehicle bus interface may run on a hardware component separate from that of the client computer device 101, such as those manufactured by Vetronix Inc. or DigiTech Inc., or may have some or all of its functions contained within the client computer device 101.

The vehicle bus interface 120 is responsible for replying to requests for parametric data. It is also responsible for continuously monitoring the vehicle bus 104 for any fault reported by the ECUs 103, in terms of diagnostic trouble codes (DTCs).

The vehicle bus interface 120 includes the following modules: vehicle bus adapter 120C, fault detector 120B, and diagnostic data service 120A. The fault detector 120B polls the vehicle bus 104 through the vehicle bus adapter 120C checking for fault codes reported by the vehicle ECUs 103. The vehicle bus adapter 120C translates the messages received from the vehicle bus into the language of the fault detector. It also translates messages from the fault detector into the language of the vehicle bus. The fault code specifications and protocols of the vehicle may be Original Equipment Manufacturer (OEM) and model dependent. The term "vehicle fault codes" is meant to be synonymous with the term "trouble code" or "diagnostic trouble code". A listing of such codes may be found in the publication of the Society of Automotive Engineers, "SAE On-Board Diagnostics for Light and Medium Duty Vehicles Standards Manual". The diagnostic data service 120A accepts request for vehicle parametric data and retrieves the data using the vehicle bus adapter.

The client computer device 101 performs several functions including communicating to the remote service center 200 by means of the network interface 107 using the cell phone 102. It sends requests for diagnostic services such as health checkup and fault diagnosis to the service center.

In support of this function, it sends diagnostic trouble codes (DTCs) and vehicle information to the service center. It handles incoming requests for data from the service center. It communicates through the user interface 105 to the driver using a combination of audio, indicator lights, and text. The severity, and optionally the description, of the reported trouble codes may be so communicated. Proper recommended actions such as "stop now", "go to a service station immediately", or "contact the service center for further help by . . . " are spoken to the driver using text-to-speech (ITS).

The client computer device 101 handles DTCs by listening for vehicle faults through the fault monitor 420, classifies the severity of the faults (e.g. alarm or warning), provides a description of the DTCs and a recommended course of action. The client computer device also manages the state of active requests, vehicle status, and other relevant information handling functions, e.g. including bootup and stored information or data.

Further, the client computer device may initiate a remote health checkup upon a user request. The driver or user may request a comprehensive, remote health checkup if the driver or user feels that the vehicle is behaving abnormally, is alerted by the application of potential trouble, or simply wants to get a checkup before a long trip.

The in-vehicle system establishes a data connection, using a cellular phone 102, with a diagnostic server 201 at the service center 200, collects diagnostic data using the diagnostic data service 120A, and uploads a snapshot of the vehicle data (e.g. VIN, test data with time-stamp) to the diagnostic server 201. The in-vehicle system may need to interact with the server 201 throughout a diagnosis or health checkup session, collecting and providing additional vehicle information as requested by the server 201. The result from the server 201 indicates either that the vehicle is in good health with no urgent action required, or that one or more problems requiring immediate attention are detected.

When the vehicle is deemed to be in good health, a report enumerating the items checked and the conditions of those items is provided to the client computer device and reported to the driver or user using TTS and the display.

When the vehicle is deemed to have a problem, the client computer device informs the driver or user to expect a callback from service center help desk personnel—customer service representative (CSR) 202D for further information. The in-vehicle system may also provide the capability to allow the driver or user to talk to a customer service representative (CSR) at the call center 202. Through the user interface 105, the driver or user may initiate a request that will result in a call back by a CSR at a later time.

Similar to the health checkup request, the in-vehicle system collects and uploads a snapshot of the vehicle data, including any trouble codes reported by the ECUs, to the diagnostic server 201. The system may also provide additional diagnostic data at the request of the diagnostic server. The driver or user may be notified that he or she will be receiving a call from the service center. The driver is also given an estimate of the time to expect the call.

Remote Service Center and Server

The remote service center 200 of FIG. 3 comprises a diagnostic server 201 that has access to data related to the vehicle such as as-built, history, diagnostics, warranty, service information and failure mode data. The diagnosis server 201 is linked to the data repository 203 via a TCP/IP link, LAN, or the like.

Further, the service center may be operatively coupled to a call center system 202 via a local area network (LAN), TCP/IP, or the like. The call center system 202 includes a service representative user interface 202A, a job queue management unit 202B, and a service data management unit 202C. The call center system 202 is linked to the data repository 203. It may be staffed with help-desk personnel (e.g. customer service representatives). Alternatively, the remote service center 200 may be completely automated.

The center 200 is optionally connected to the dealer's network (as shown in FIG. 1) to provide additional services such as dispatching service vehicles, service scheduling, parts ordering, dealer references and the like.

Within the diagnostic server 201 at the service center 200 is a diagnosis engine 201A. The main function of the diagnosis engine 201A is to provide a health checkup or a diagnosis using the data obtained from the vehicle, the vehicle's past history, and the diagnostics information about the particular model of the vehicle. It is also possible to incorporate qualitative symptom descriptions from the driver as part of the diagnostic input.

The diagnosis engine 201A may deploy a combination of technologies, ranging from model-based monitoring to case-based reasoning, to determine the health of the vehicle, identify potential troubles, and diagnose existing problems. The diagnostic server 201 also includes components that interact with the vehicle client 101, the vehicle data repositories 203, and the call-center 202 system.

An exemplary operation of the server center is described below. Upon receiving a request from the client, the server 201 establishes a diagnosis session, and collects data from the in-vehicle system 100 and the data repository 203, as guided by the diagnosis engine 201A.

The diagnosis engine 201A first determines if a fault or a potential of a fault is present by checking if any trouble code is reported by the client, and checking a predetermined list of vehicle attribute values against their normal operating characteristics. If no fault is found and the vehicle data appears normal, the diagnosis engine 201A returns a health report to the server 201. The server 201 in turn returns the report to the client computer device 101 via the data connection, and terminates the session.

If a fault or potential of a fault is identified, the diagnostic server 201 informs the vehicle client computer device about the presence of trouble, and then terminates the data connection. Server 201 then compiles the relevant data and creates a case for the call center system 202 to handle.

An available customer service representative 202D picks up the case from the to-be-responded job queue and initiates a voice call to the vehicle. Assisted by diagnosis tools (e.g., on-line manuals, rule-based diagnosis or case-based reasoning), the customer service representative (CSR) 202D analyzes the problem and may identify the cause of the fault. The driver or user also may describe certain symptoms not captured by the diagnostic data (e.g. noise, vibration, etc.) to the CSR. The CSR in turn feeds the symptom descriptions to the diagnostic server 201 to conduct further analysis. Through voice dialogs with the driver or user, the CSR can explain the diagnosis and provide advice on what to do with the problem. Finally, the case is logged by the system with case resolution input from the CSR.

In a preferred embodiment, no voice communication call is made to the driver unless such a request has been made by the driver through use of the user interface buttons or speech recognition. Information may otherwise be returned to the driver through the use of data communications.

In an exemplary implementation, only a subset of data, such as vehicle information and diagnostics for the vehicle model (e.g., 1999 Mercedes ML 320), and functions, such as fault determination and health checkup, necessary for supporting various scenarios, as described below, are made available at the service center. Of course, the designer can include any or all of the above data in combination with different data, as determined by the designer's constraints and requirements.

Exemplary Implementations

The invention may be employed with great utility in a large variety of situations. Several exemplary scenarios are discussed in detail below.

Fault Monitoring and Diagnostics

Referring to FIG. 3, the system can be employed for fault monitoring and diagnostics.

In such a case, for example, one or more diagnostic trouble codes, generated by the vehicles' ECUs 103, are detected in the vehicle bus interface 120 by the fault detector 120B. These trouble codes are sent to the fault monitor 420 component of the vehicle client computer device 101. The fault monitor may further process these trouble codes and finally sends them to the diagnostic client 421.

Thereafter, the diagnostic client 421 classifies the severity of trouble codes into a predetermined severity class (e.g. a warning of a pending problem or an alarm indicating immediate attention needed because of a severe malfunction) and also determines an associated set of recommended actions for the driver (or other user, e.g. passenger or navigator) of the vehicle 140 (shown in FIG. 1). It is to be understood that the terms "driver" or "user" indicate any vehicle user who employs the invention.

The driver is informed by the user interface 105, by audio (e.g., TTS, prerecorded, or synthesized sounds) and/or visual display output using the output devices 315 and 316 of the user interface 310 shown in FIG. 2, that a vehicle fault, characterized by the reported trouble codes, has been detected and whether the fault is a warning or an alarm. The driver is also advised to take appropriate action based on the severity of the fault (e.g. "pull over" to a safe area). At the same time, a "Call Me" button and an "Acknowledge" button appear on the touch screen display. These buttons may also be physically installed buttons 301A., as shown in FIG. 2.

The driver or user may acknowledge this fault message by pressing the "Acknowledge" button. In this case, the diagnostic client can assume that the driver has been informed and take appropriate action (e.g. stop playing audio alert message, alter visual display, etc.). If the driver does not acknowledge the fault message, the diagnostic client may take some action on behalf of the driver, based on the prior classification of the received vehicle fault(s). For example, if the vehicle fault indicates that the air bags have been deployed, the diagnostic client 421 may automatically initiate requests to the service center 200 to notify police, dispatch emergency medical assistance and roadside service.

The driver may initiate a vehicle diagnostics request by pressing the "Call Me" button (from the driver point of view, pressing the "Call Me" button will result in a call to the driver by a service representative from the service center), or by pressing the PTT button 301A shown in FIG. 2 and issuing a equivalent spoken command. In this case, a data communication link is established through the network interface 320 to the service center 200, and data containing fault codes, DTCs, vehicle parameter values, and vehicle ID information, is sent to the diagnostic server 201. The size of the data stream is estimated to be on the order of 1 kilobyte. Optional information includes a callback number, GPS coordinates, etc. The exchange of information may be repeated more than once before the data link is closed.

The call center server 202 receives this information, in addition to the analytical results of the diagnostic server (e.g., diagnosis of vehicle problem and recommended actions for repair), displays the information for the help desk personnel (including service representatives) 202D, and fetches stored vehicle information from the data repository 203 for the service representative. A voice call is simultaneously placed to the vehicle, connecting the service representative 202D to the vehicle driver or user 140.

The service representative at the help desk 202 greets the driver and suggests a course of action. For severe vehicle-disabling malfunctions, the service representative may take various assisting actions (e.g., telephone a garage, alert roadside assistance, dispatch help immediately). For less severe vehicle faults, the service representative may arrange for vehicle service by consulting the driver and dealer service center, schedule and parts availability. Out-of-stock parts may be ordered and repair scheduled based on part lead-times. All or some of these options may be incorporated into the inventive system.

Figure 4:
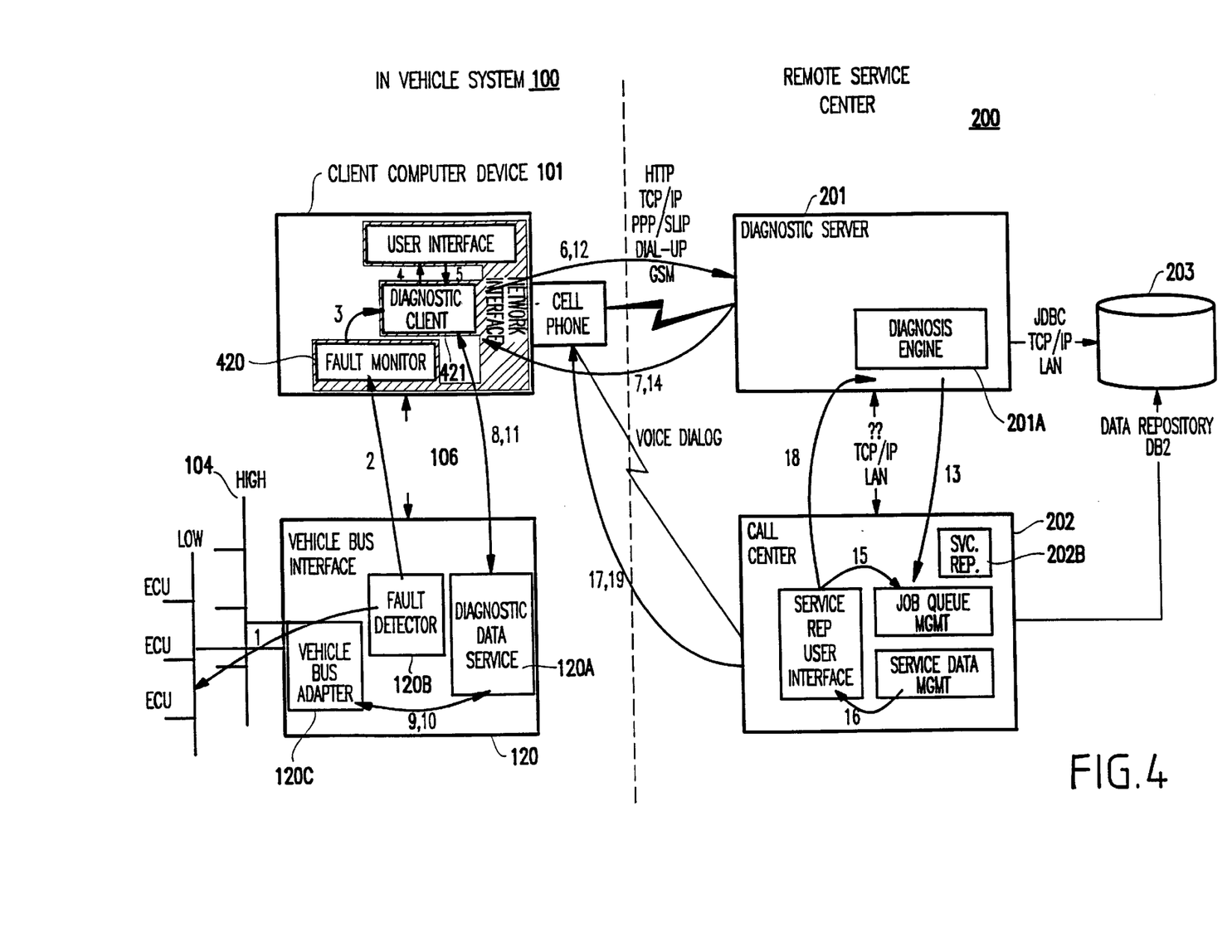
FIG. 4 illustrates a fault monitoring and diagnosis event operation flow.

Turning to FIG. 4, a process flow will be described with reference to step numbers shown in FIG. 4.

In FIG. 4, the fault detector 120B periodically polls the vehicle bus 104, checking for fault codes reported by the vehicle ECUs (step 1).

Then, in step 2, the fault detector 120B reports newly detected fault codes along with associated information (e.g. time stamp, etc.) to the fault monitor 420 on the vehicle client computer device. (An alternative implementation is that the fault detector 120B is a part of the fault monitor 420 which periodically polls the ECUs through the vehicle bus adapter 120C.) In step 3, the fault monitor notifies the diagnostic client about the occurrence of the faults detected along with the fault codes.

Thereafter, the diagnostic client determines the severity of the faults by looking in the predefined fault code/severity/recommendation table (step 4). It communicates with the driver through the user interface 100 about the detected faults, their severity and recommended driver actions. There are a plurality of severity levels such as a warning and/or an alarm.

In step 5, the driver triggers a request for further information about the faults and guidance. For example, the driver may press the "Call Me" button (or the like on the touch screen). Then, the diagnostic client 421 initiates a diagnosis session with the diagnostic server 201 (step 6). The diagnostic client 421 passes the fault codes, vehicle identification and other relevant information to the server 201.

In step 7, the diagnostic server requests additional information (e.g. vehicle parametric data) from the diagnostic client 421. Then, in step 8, the diagnostic client requests the data from the diagnostic data service 120A.

In step 9, the diagnostic data service interrogates the ECUs 103 via the vehicle bus adapter 120C for the requested data.

Then, in step 10, the ECUs 103 provides the requested data. In step 11, the data is returned to the diagnostic client 421, and thereafter, in step 12, the data is in turn transmitted to the diagnostic server 201. Steps 7 through 12 may be repeated to obtain all of the relevant vehicle data.

In step 13, the diagnostic server places the request on a job queue for the call center 202 to process and simultaneously initiates the diagnosis engine 201A analysis. The diagnostic analysis may consist of comparing the diagnostic data with a standard data set containing a list of known faults and recommended actions or may include a more complex fault classification analysis using techniques such as a neural network, classification trees, expert systems, case-based reasoning, and pattern recognition.

Then, in step 14 the diagnostic server 201 provides the diagnostic client 421 with an estimate of when to expect a call back from the customer service representative, and terminates the data connection. The diagnostic client 421 then conveys this information to the driver through the user interface 105. After the diagnosis engine 201A has completed its analysis and posted the results, a service representative can pick up the job from the queue using the service representative user interface 202A. (In step 15)

In step 16, all information relevant to this diagnosis transaction is gathered and presented to the representative, and then, in step 17, the service representative places a call to the driver, through, for example a phone network to a cellular telephone located in the vehicle. If the cause of the faults cannot be identified based on the available data, the service representative may ask the driver for qualitative descriptions of the symptoms.

In step 18, the service representative may use this newly provided information and reinvoke the diagnostic server 201 to investigate the problem further. Finally, in step 19, the service representative communicates with the driver, and provides guidance.

Vehicle Health Checkup

The inventive system also may be employed to advise of the health of the vehicle.

In this scenario, the driver initiates an automated health checkup by using the touch-screen or speech recognition user interface 310 of the vehicle client 101.

Then, vehicle information, estimated to be on the order of 1 kilobyte in size, including, for example, vehicle identification number (VIN), any trouble codes, and/or a snapshot of the vehicle data, are retrieved by the vehicle client 101 through the vehicle bus interface 120.

The vehicle client 101 combines vehicle ID information with the information from the vehicle bus interface 120 and sends the data to the Diagnostic Server 201 over a data link. The data link is kept open.

The diagnostics server 201 retrieves vehicle information from the data repository 203 and compares the data from the vehicle with the repository data. Then, the diagnostic server 201 prepares a report listing any out-of-range parameters and actions required (e.g., "coolant level is low"). Trend analysis on the parameters may also be performed, based on the present and historical data collected from the vehicle, to detect any drifting of the performance characteristics and to provide early guidance for preventive maintenance (e.g., "change oil in 1500 miles").

The report is sent to the client computer device 101 over the data link. The client computer device stores the results in memory 350, displays them on the touch screen, and reads them to the driver via TTS. The driver is given the option of placing a call to speak to a service representative 202D at the call center 202.

Figure 5:
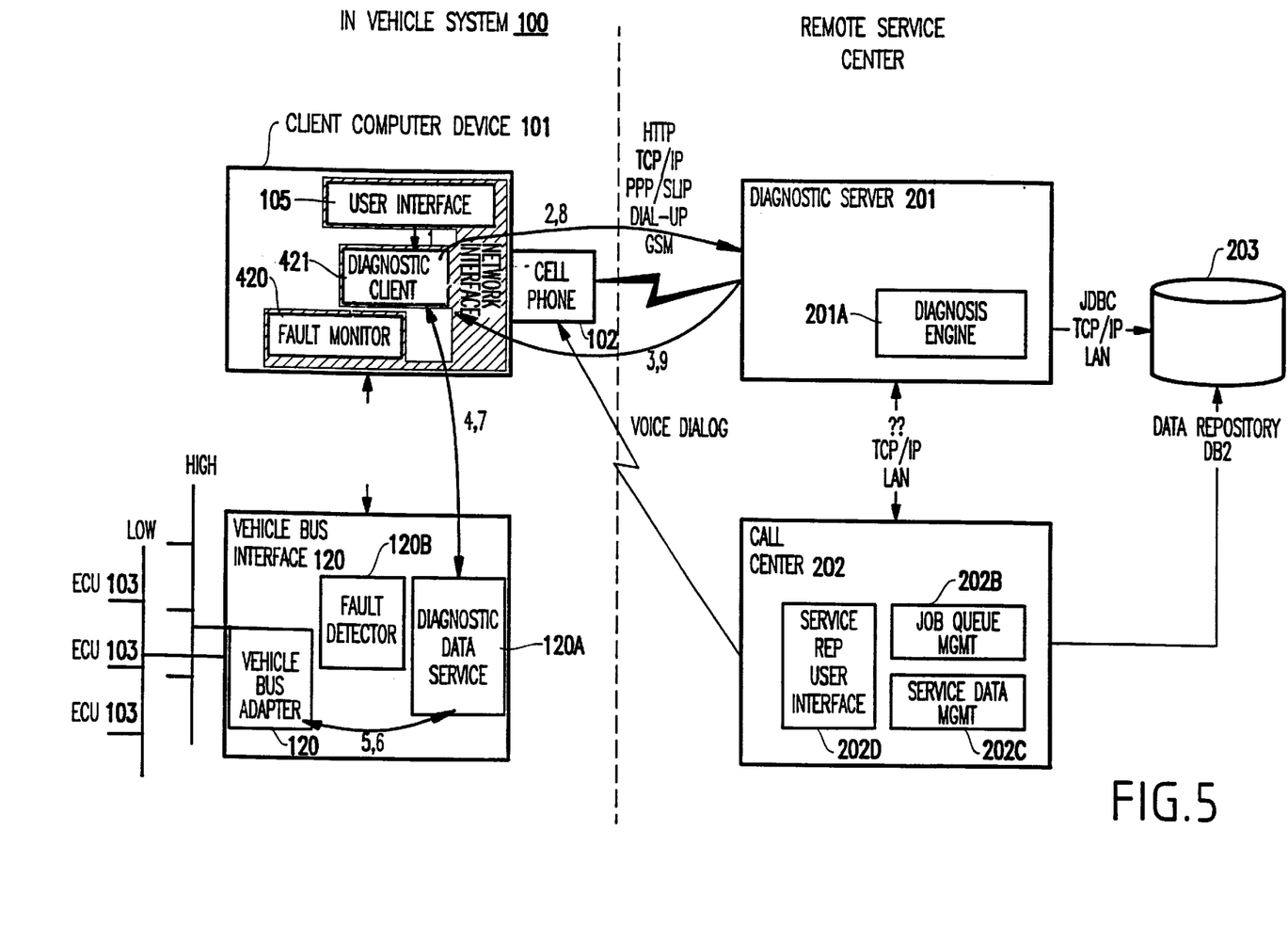
FIG. 5 illustrates a health checkup event operation flow according to the invention.

Referring now to FIG. 5, a health checkup event flow is presented. The numbers of the steps refer to the numbers found in the flow, as shown in FIG. 5.

First, in step 1, the driver triggers a request (e.g., presses the "Checkup" button) for an automated vehicle health checkup by using the touch-screen or speech recognition user interface 105 of the vehicle client.

Then in step 2, the diagnostic client 421 initiates a health checkup session with the diagnostic server 201, and in step 3, the diagnostic server instructs the diagnostic client to gather vehicle data, such as VIN, malfunction codes, and/or a snapshot of the vehicle data.

Then in step 4, the diagnostic client 421 requests the data from the diagnostic data service 120A at the vehicle bus interface 120. Then, in step 5, the diagnostic data service interrogates the ECUs 103 via the vehicle bus adapter 120C for the requested data.

In step 6, the ECUs 103 provide the requested data, and in step 7, the data is returned to the diagnostic client 421. Then, in step 8, the data is in turn transmitted to the diagnostic server 201. The diagnostic client may use a visual interface, such as a progress bar to inform the driver that processing is in progress.

In step 9, the diagnostic server 201 compares the vehicle data with the stored nominal values. The diagnostic server 201 prepares a report and transmits it to the client computer 101. The report may be displayed on the client's display using indicator icons that are easily understandable by the driver at a glance while operating the vehicle. For example, a "thumbs up", a "thumbs down", or a flat hand or the like, and a summary of the report, may be displayed on the output device 316. Thereafter, the data connection is terminated.

The above-described health checkup process may be completely automated without intervention or involvement by a person at the remote service center.

The present invention is not limited to the scenarios and embodiments listed above, but instead may be practiced with a plurality of modifications and extensions.

For example, remote health monitoring and diagnostics shares many features with other automotive applications and services. It may be desirable to bundle the remote health monitoring and diagnostics with other services or to extend it with related application functions. For example, the remote diagnostics service could certainly be offered on top of an Emergency/Mayday service (e.g., "OnStar"). Other applications and services that can be developed or bundled as extensions of the diagnostics services include: breakdown service, network diary, vehicle user manual update, OEM Callback Services, fleet management, theft prevention, vehicle parameter update/change, remote vehicle access, concierge services, etc.

While the invention has been described in terms of several preferred embodiments, those skilled in the art will recognize that the invention can be practiced with modification within the spirit and scope of the appended claims.

What is claimed is:

1. An information system for a vehicle, comprising:
   a client computer device within the vehicle, coupled to the vehicle's monitoring systems, for data management, remote session management and user interaction;
   a communication system, coupled to said client computer device, for providing remote communication of data including data derived from said monitoring systems of the vehicle; and
   a remote service center including a vehicle data store, a server computer, a diagnostic engine, and a communicator for communicating the results of analysis of vehicle information to said client computer device via said communication system,
   wherein said data communicated comprises vehicle identification information, and
   wherein said communication system provides for voice communications.

2. The system according to claim 1, wherein said data further comprises at least one of vehicle location data and diagnostic data.

3. The system according to claim 1, wherein said client computer device comprises a processor system including a processor, a memory coupled to said processor, input/output (I/O) ports, a user interface, and a communication device.

4. The system according to claim 3, wherein said user interface includes an input device comprising at least one of speech recognition, speaker identification, voice recording, touch screen display, and actuator buttons.

5. The system according to claim 3, wherein said user interface includes an output device comprising at least one of text-to-speech, voice playback, auditory signals, display screen, and indicator lights.

6. The system according to claim 1, wherein said client computer device comprises at least one of an embedded computer, a laptop computer and a personal data assistant (PDA).

7. The system according to claim 1, wherein the client computer device is coupled to a vehicle bus through a vehicle bus interface.

8. The system according to claim 7, wherein said vehicle bus interface uses one of an RS-232 interface, a universal serial bus (USB), an ITS Data Bus (IDB), and Ethernet.

9. The system according to claim 7, wherein said vehicle bus comprises one of a controller area network (CAN) and Society of Automotive Engineers' SAE J1850 data communication network interface.

10. The system according to claim 1, wherein said client computer device is integrated with a telephone to provide establishment of at least one of a data connection and a voice connection with said remote service center.

11. The system according to claim 1, wherein said remote service center includes a call center which is automated.

12. An information system for a vehicle, comprising:

a client computer device within the vehicle, coupled to the vehicle's monitoring systems, for data management, remote session management and user interaction;

a communication system, coupled to said client computer device, for providing remote communication of data including data derived from said monitoring systems of the vehicle; and a remote service center including a vehicle data store, a server computer, a diagnostic engine, and a communicator for communicating the results of analysis of vehicle information to said client computer device via said communication system, wherein said remote service center includes a call center including help-desk personnel.

13. The system according to claim 12, wherein the call center performs at least one of diagnostic analysis, provides recommendations, schedules services, orders parts, and dispatches assistance.

14. The system according to claim 12, wherein said client computer device is integrated with a telephone to provide establishment of at least one of a data connection and a voice connection with said remote service center.

15. The system according to claim 12, wherein said call center help-desk personnel access data related to the vehicle.

16. The system according to claim 12, wherein said call center includes a service representative user interface, a job queue management unit, and a service data management unit linked to a data repository of the service center.

17. The system of claim 12, wherein said communication system provides for voice communications.

18. The system of claim 12, wherein said remote service center includes a call center including help-desk personnel.

19. A method of remote diagnostics of a vehicle, comprising:

detecting, by a fault monitor, one or more fault codes generated by an electronic control unit of said vehicle;

notifying a diagnostic client of said fault codes;

checking, by said diagnostic client, the codes against a stored list to distinguish warning codes from a severe malfunction;

based on said checking, advising a user whether a warning code or a severe malfunction is present;

based on said advising, initiating a call to a remote service center using a data link;

forwarding data containing malfunction codes, vehicle parameter values, and vehicle identification information to a diagnostic server of said remote service center; and receiving, by the diagnostic server, said data, and fetching stored vehicle information from a data repository, and displaying said data and the stored vehicle information for a service representative, while simultaneously placing a call to the vehicle.

20. The method according to claim 19, wherein for a predetermined malfunction, said service representative communicates with a service facility to dispatch assistance.

21. The method according to claim 19, wherein said detecting, notifying, and checking is performed more than one time.

22. The method according to claim 19, wherein said call to said remote service center is initiated by the user.

23. The method according to claim 19, wherein said call from said remote service center to said vehicle connects said service representative to the vehicle user.

24. The method according to claim 19, wherein said call to said vehicle connects said diagnostic server to said diagnostic client within the vehicle.

* * * * *